(12) United States Patent
Lambert (10) Patent No.: US 8,532,286 B2
(45) Date of Patent: Sep. 10, 2013

(54) SYSTEM AND METHOD FOR REDUCING THE COMPUTATION AND STORAGE REQUIREMENTS FOR A MONTGOMERY-STYLE REDUCTION

(75) Inventor: Robert John Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 388 days.

(21) Appl. No.: 12/838,999

(22) Filed: Jul. 19, 2010

(65) Prior Publication Data

US 2011/0013768 A1    Jan. 20, 2011

Related U.S. Application Data

(60) Provisional application No. 61/226,427, filed on Jul. 17, 2009.

(51) Int. Cl.
     *H04K 1/00*          (2006.01)

(52) U.S. Cl.
     USPC .............................................. 380/28; 380/30

(58) Field of Classification Search
     USPC .............................................. 380/265, 28, 30
     See application file for complete search history.

(56) References Cited

U.S. PATENT DOCUMENTS

| | | | | |
|---|---|---|---|---|
| 5,261,001 | A * | 11/1993 | Dariel et al. | 380/30 |
| 6,182,104 | B1 * | 1/2001 | Foster et al. | 708/501 |
| 6,240,436 | B1 * | 5/2001 | McGregor | 708/491 |
| 6,356,636 | B1 * | 3/2002 | Foster et al. | 380/30 |
| 6,397,241 | B1 * | 5/2002 | Glaser et al. | 708/625 |
| 6,424,987 | B1 * | 7/2002 | Romain | 708/492 |
| 6,671,709 | B2 * | 12/2003 | Glaser et al. | 708/492 |
| 6,748,410 | B1 * | 6/2004 | Gressel et al. | 708/491 |
| 6,782,100 | B1 * | 8/2004 | Vanstone et al. | 380/28 |
| 7,552,377 | B1 * | 6/2009 | Jones | 714/759 |
| 7,912,886 | B2 * | 3/2011 | Gopal et al. | 708/491 |
| 7,925,011 | B2 * | 4/2011 | Gopal et al. | 380/30 |
| 8,005,210 | B2 * | 8/2011 | Ozturk et al. | 380/30 |
| 8,020,142 | B2 * | 9/2011 | Wolrich et al. | 717/106 |
| 8,392,494 | B2 * | 3/2013 | Gopal et al. | 708/650 |
| 2003/0009503 | A1 * | 1/2003 | Glaser et al. | 708/625 |

(Continued)

FOREIGN PATENT DOCUMENTS

| EP | 1 818809 A1 * | 8/2007 |
|---|---|---|
| EP | 1818809 A1 | 8/2007 |

OTHER PUBLICATIONS

Menezes, A. et al.; Handbook of Applied Cryptography; 1997; pp. 600 to 602, 631; CRC Press, Boca Raton, Florida.

(Continued)

*Primary Examiner* — Brian P Whipple
(74) *Attorney, Agent, or Firm* — Brett J. Slaney; John R. S. Orange; Blake, Cassels & Graydon LLP (57) ABSTRACT

A system and method are described that provide an alternative way in which to produce a Montgomery reduction from below by storing a new precomputed value used to substantially replace the μ and n values used in Montgomery reduction with a single value. By modifying the Montgomery reduction mechanism in this way, the number of multiplications and registers required to effect the Montgomery reduction can be reduced. To avoid having to store both μ and n, a modified reduction value or a logical shift or signed version of such a value can be used in place of μ and n for the bulk of the low-order reduction.

25 Claims, 6 Drawing Sheets

(56) References Cited

U.S. PATENT DOCUMENTS

| | | | |
|---|---|---|---|
| 2004/0096057 A1* | 5/2004 | Moore | 380/28 |
| 2006/0126830 A1 | 6/2006 | Shimizu | |
| 2008/0144811 A1* | 6/2008 | Gopal et al. | 380/30 |
| 2008/0147768 A1* | 6/2008 | Gopal et al. | 708/491 |
| 2008/0148024 A1* | 6/2008 | Wolrich et al. | 712/221 |
| 2009/0003594 A1* | 1/2009 | Ozturk et al. | 380/30 |
| 2009/0268900 A1* | 10/2009 | Lambert | 380/28 |
| 2010/0146028 A1* | 6/2010 | Lambert | 708/491 |
| 2010/0332578 A1* | 12/2010 | Gopal et al. | 708/650 |
| 2011/0270906 A1* | 11/2011 | Lambert et al. | 708/491 |

OTHER PUBLICATIONS

San Millan Maeso, J.; Search Report from corresponding European Application No. 10169936.1; search completed Nov. 15, 2010.

Knezevic, M. et al.; "Modular Reduction without Precomputational Phase"; May 2009; pp. 1389 to 1392; IEEE International Symposium on Circuits and Systems, Tapei; ISBN: 978-1-4244-3827-3.

Shen, H. et al.; "Unbalanced Exponent Modular Reduction over Binary Field and Its Implementation"; Sep. 2006; pp. 190 to 193; First International Conference on Innovative Computing, Information, and Control, Beijing; ISBN: 0-7695-2616-0.

Freking, W.L.; Parhi, K.K.; "A Unified Method for Iterative Computation of Modular Multiplication and Reduction Operations"; Oct. 1999; pp. 80 to 87; International Conference on Computer Design, Austin, Texas; ISBN: 0-7695-0406-X.

Savas, E.; Koc, C.K.; "The Montgomery Modular Inverse—Revisited"; Jul. 2000; pp. 763 to 766; IEEE Transactions on Computers; vol. 49, Issue 7; ISSN: 0018-9340.

\* cited by examiner

Prior Art

SYSTEM AND METHOD FOR REDUCING THE COMPUTATION AND STORAGE REQUIREMENTS FOR A MONTGOMERY-STYLE REDUCTION

This application claims priority from U.S. Provisional Application No. 61/226,427 filed on Jul. 17, 2009, the contents of which are incorporated herein by reference.

TECHNICAL FIELD

The following relates generally to Montgomery arithmetic and in particular provides a system and method for reducing the computation and storage requirements for a Montgomery-style reduction.

BACKGROUND

In cryptography, e.g. public key cryptography, operations such as multiplication or exponentiation of integers in some group $Z_n$ may be required, where modular arithmetic is used to operate on the integers. For example, to multiply two numbers modulo some n, the classical approach is to first perform the multiplication and then calculate the remainder. Although the classical approach is simple for basic operations such as in multi-precision calculations and does not require precomputation, the step of calculating the remainder is considered slow. The calculation of the remainder is referred to as reduction in modular arithmetic.

Modular reduction is often employed in cryptographic applications. Of the well known methods for modular reduction, the most commonly used is the method of Montgomery modular reduction, referred to as Montgomery reduction in short. Montgomery reduction avoids the expensive division operations typically used in classical modular reduction. Montgomery reduction benefits from the fact that steps of multiplication and shifting are generally faster than division on most computing machines. Montgomery reduction relies on performing certain precomputations and, by doing so, many calculations can be done faster. Also, as opposed to classical methods of reduction-from-above such as Euclidean division, Montgomery reduction reduces from below, that is, the method proceeds by clearing the least-significant portions of the unreduced quantity, leaving the remainder in the upper portion.

In Montgomery reduction, calculations with respect to a modulus n are carried out with the aid of an auxiliary number R called the Montgomery radix or base. When the modulus is a prime number, a good choice of radix is 2 to some exponent, typically chosen as the first convenient power of 2 larger than the modulus. In the following, the exponent of 2 is denoted by L so that $R=2^L$. The Montgomery reduction of a number a with radix R and prime modulus n is the quantity given by $aR^{-1}$ mod n. The Montgomery multiplication of two numbers is the Montgomery reduction of their product, written as $a \otimes b = abR^{-1}$ mod n. Calculations are carried out on numbers in their Montgomery form. The Montgomery form of a number a is defined $â=aR$ mod n. Conversion to Montgomery form may be carried out via Montgomery multiplication where $â = a \otimes R^2 = aR$ mod n. Conversion from Montgomery form back to regular form may be carried out by the Montgomery reduction: $âR^{-1}$ mod n=a mod n, or by the Montgomery multiplication: $â \otimes 1 = aRR^{-1} = a$ mod n.

In a given cryptographic system, a computational engine may be used for calculating the Montgomery product of two numbers, this engine being sometimes referred to as a Montgomery engine or Montgomery machine. The engine may be implemented in a hardware or software module and operates on a set of parameters to produce a result. For example, the engine may be used to produce the result $a \otimes b$ on inputs a and b. The Montgomery engine can also be configured to convert to and from Montgomery form. To convert to Montgomery form, the engine accepts a and $R^2$ as inputs and produces an output â. Conversely, for converting back to normal form, the engine accepts â and 1 as inputs and outputs a. The engine may also be configured to calculate the Montgomery reduction of a number. In this case, the engine accepts a and 1 as inputs and produces $aR^{-1}$ mod n as an output. To initialize the Montgomery engine, the engine is loaded with a modulus n and a radix R.

The use of Montgomery reduction as a component of Montgomery multiplication is well known. There are many algorithms that can be used to perform the Montgomery multiplication. In one example, the Montgomery multiplication of two k-digit integers a and b in base $2^w$, reduced mod an k-digit integer n, where $a=(a_{k-1} \ldots a_1 a_0)$, $b=(b_{k-1} \ldots b_1 b_0)$, $n=(n_{k-1} \ldots n_1 n_0)$ where each component is written base $2^w$, and $0 \leq a, b < n$, produces an output $abR^{-1}$ mod n. Multi-precision values are typically expressed in base $2^w$ form, where w is the wordsize of the machine in bits. In this example, $R=2^L$ as above, and an additional precomputed value, $\mu = -n^{-1}$ mod $2^w$, is also used in the reduction. In one exemplary algorithm. Montgomery multiplication may proceed as follows:

1. $c \leftarrow 0$, where c will hold the result $abR^{-1}$ mod n and $c=(c_k c_{k-1} \ldots c_1 c_0)$.
2. For i from 0 to (k-1) do the following:
   2.1 $m \leftarrow (c_0 + a_i b_0) \mu$ mod $2^w$; and
   2.2 $c \leftarrow (c + a_i b + mn)/2^w$.
3. If $c \geq n$ then $c \leftarrow c-n$.
4. Return (c).

The implementation of Montgomery multiplication is a fundamental operation on values in Montgomery representation. Step 3 can leak information about quantities under computation and is therefore sometimes omitted, in which case the output quantity is not fully reduced. As can be appreciated, efficiency may be increased by pre-computing certain fixed values to be used in the calculations. Such values include $\mu = (-n)^{-1}$ mod $2^w$, for some w typically being the bit size of a word (or block) of the value (or perhaps the entire value) being operated on; and $R^2$ mod n. In this example, the multiplication of a and b have been interleaved with the Montgomery reduction. In the next example, we will consider directly performing Montgomery reduction on a value a.

In Montgomery reduction, the value $\mu$ is used to zero w least significant bits of a value a. First, a multiplier $m = \mu a$ mod $2^w$ is computed. The value m has at most w bits. Adding a+mn will zero w least significant bits of a, and a may be shifted down w bits. Since typically L=kw, where k is the number of w-bit words in R; this operation is repeated k times to effect the Montgomery reduction $aR^{-1}$ mod n.

Often, a also results from a multiplication operation and, therefore, is twice the size of the modulus n. Alternatively, multiplication can be implemented by interleaving the expansion of multiplication with Montgomery reduction, as in the previous example.

In a register-based processor, registers are typically used to hold components of the value to be reduced, namely the precomputed value $\mu$ and the modulus n.

BRIEF DESCRIPTION OF THE DRAWINGS

Embodiments of the invention will now be described by way of example only with reference to the appended drawings wherein.

DETAILED DESCRIPTION OF THE DRAWINGS

To improve the reduction efficiency of a Montgomery machine, the objective should be to reduce the number of operations, especially word-by-word multiplication, and to maximize the number of components that can be kept in registers, reducing the loading and storing of temporary values.

In the following embodiments, a system and method are utilized that provide an alternative way in which to produce a Montgomery reduction from below by storing a new precomputed value used to substantially replace the µ and n values used in Montgomery reduction with a single value. This may be done by storing a modified reduction value in the cryptographic apparatus, wherein the modified reduction value, when applied to an operand, input to or generated by, the cryptographic apparatus, performs a replacement for values in a low-order segment which is a target of the reduction, rather than a cancellation thereof, as performed in a standard Montgomery reduction; and performing the reduction from below using the modified reduction value.

By modifying the Montgomery reduction mechanism in this way, the number of multiplications and registers required to effect the Montgomery reduction can be reduced. To illustrate the effects of this modified Montgomery reduction, an example of a cryptographic system and Montgomery architecture within such a system will first be described.

Figure 1:
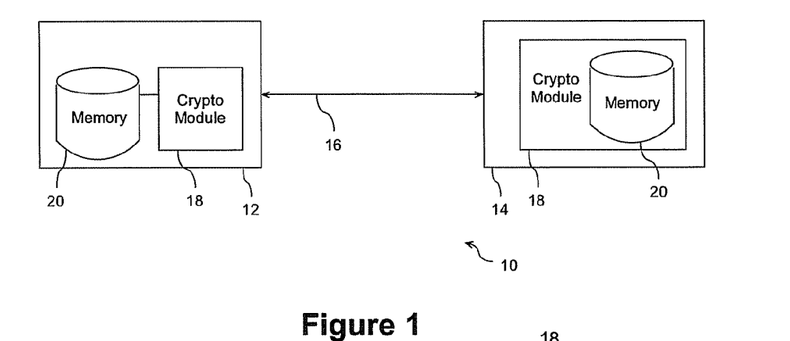
FIG. 1 is a schematic block diagram of a cryptographic communication system.

Referring now to FIG. 1, a computer implemented cryptographic system 10 in this example generally comprises a first correspondent 12 that communicates with a second correspondent 14 over a communication channel 16. Each correspondent includes a cryptographic module 18, which either has its own memory 20 for storing inputs, outputs and intermediate portions of cryptographic operations, or has access to an external memory 20 that is part of the correspondent (12, 14). It can be seen that in the example shown in FIG. 1, the first correspondent 12 includes a memory 20 external to the cryptographic module 18 and the second correspondent 14 includes memory 20 that is internal to the cryptographic module 18 to illustrate that the capability to store data can be provided in any suitable arrangement. It will also be appreciated that the memory 20 can be external to and accessible (e.g. via a network connection etc.) to the correspondent 12, 14 (not shown) if necessary or desired.

Figure 2:
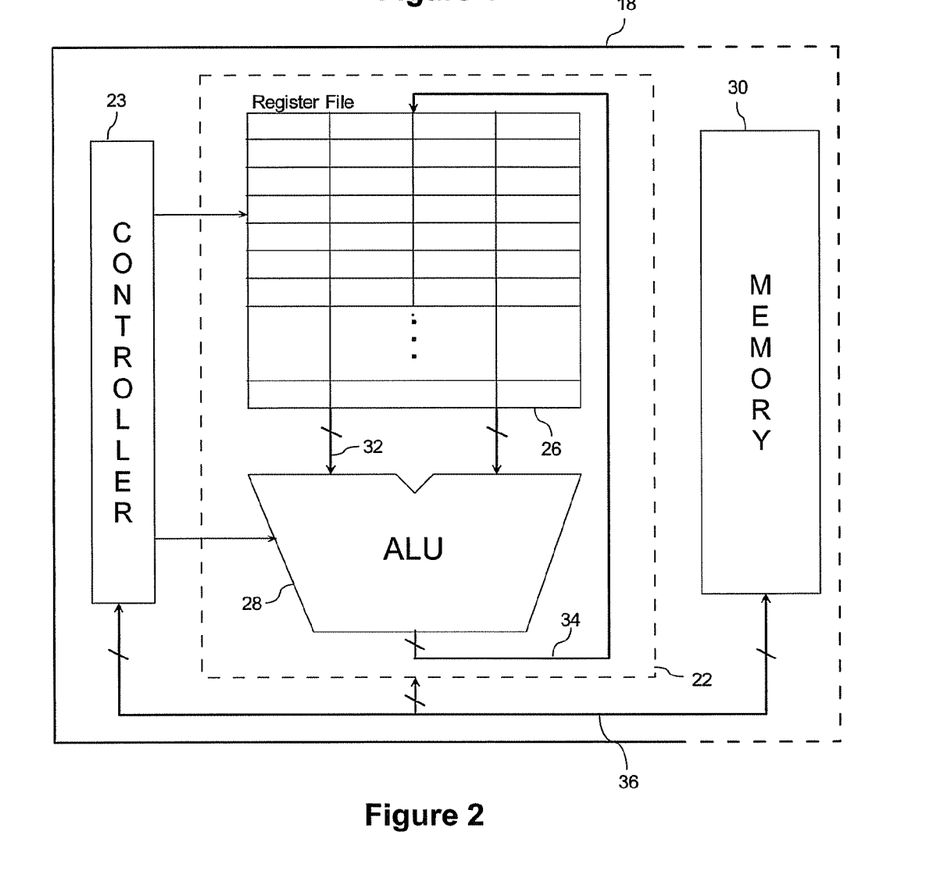
FIG. 2 is a schematic block diagram of any one or both of cryptographic modules shown in FIG. 1.

The cryptographic module 18 is configured to perform cryptographic operations such as encryption/decryption, signing and modular arithmetic, etc. In this example, the cryptographic module 18 is configured for performing elliptic curve cryptographic (ECC) operations, and includes a block Montgomery machine 22, further detail of which is shown in FIG. 2. It will be appreciated that the cryptographic module 18 and any component thereof may be implemented as an apparatus in hardware or in software (computer readable instructions embodied in/on a computer readable medium).

As can be seen in FIG. 2, the cryptographic module 18 includes a controller 23, the block Montgomery machine 22, and a memory 30. The machine 22 generally comprises a register file 26 and an arithmetic logic unit (ALU) 28.

The memory 30 may also be included in the machine 22 or be external to the machine 22 as illustrated. It will be appreciated that the memory 30 may comprise all or part of the memory 20 (shown in FIG. 1) or may be provided as a separate component in the cryptographic module 18 as shown. The memory 30 may include random access memory (RAM), read only memory (ROM) and/or any other type of suitable memory structure.

The register file 26 is a group of general purpose registers, which may be used as intermediate storage for cryptographic operations performed for and by the cryptographic module 18. The register file 26 communicates with the ALU 28 via data input buses 32. The ALU 28 comprises integer arithmetic circuitry. A data output or result bus 34 is provided from the ALU 28 to the register file 26 for writing results of computations performed in the ALU 28 to the register file 26.

Computational operations of the ALU 28 are controlled via programmed or hardwired instructions residing in or accessible to the controller 23. A memory bus 36 is also provided to enable the controller 23 and the machine 22 to utilize memory 30 when performing and outputting results of the cryptographic operations. Typically, the machine 22 is utilized in an existing host computer system and the controller 23 receives control signals from the host system and communicates data to the register file 26 and ALU 28.

The general purpose registers that make up the register file 26 are made up of a certain number of blocks, each having a fixed length, e.g. 128 bits. As is well known in the art, the blocks are used to store data (operands, results etc.) during Montgomery computations.

In a typical implementation, to perform a w-bit reduction of $a = [\ldots, a_4, a_3, a_2, a_1, a_0]$ in Montgomery style, i.e. from below or low order, the multiplier m is first computed such that $m = \mu \times a_0 \mod 2^w$. The multiplier m is then used to compute $a + m \times n$. Since the reduction operation (whether interleaved or not) repeats this operation to complete the whole Montgomery reduction, it is efficient to have both µ and n accessible to the ALU 28 in registers (e.g. in the register file 26).

Figure 3:
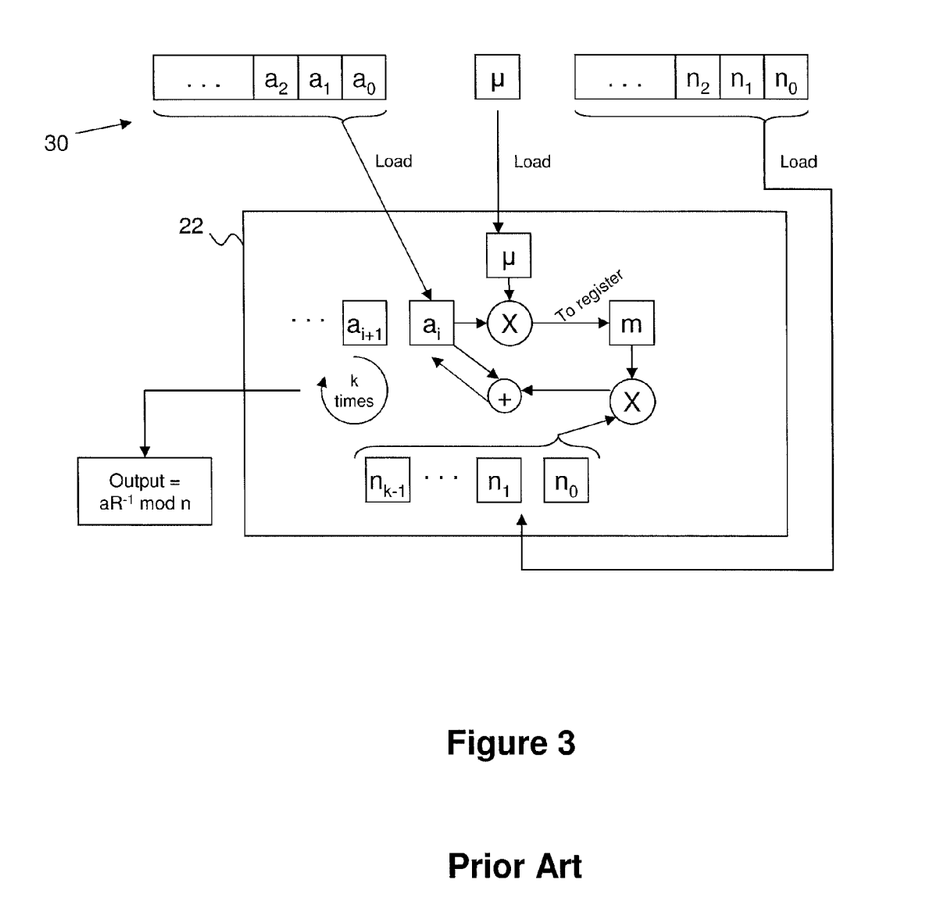
FIG. 3 is a schematic block diagram of logical operations performed during a typical Montgomery-style reduction.

When programmed or otherwise configured or initialized to perform such a Montgomery style operation, the machine 22, including registers and logic may operate as shown in FIG. 3. In FIG. 3, it can be observed that in addition to the operand a, both µ and n are loaded and stored in registers such that they are available throughout the k iterations. Storage space is also required for the value representing m. It can also be observed from FIG. 3 that a single digit and a multi-digit multiplication operation and multi-digit addition operation are required during each iteration. In the configuration shown in FIG. 3, both a and n are represented by an appropriate number of w-bit words, e.g. $a_0$, $a_1$ etc.; and $n_0$, $n_1$ etc. Also, the machine 22 would typically be pre-programmed to operate in w-bit words, e.g. a 32-bit machine (or similarly a 64-bit or 128-bit machine), and thus a value representative of w would be available or otherwise known to the machine 22 for computing $2^w$.

Figure 4:
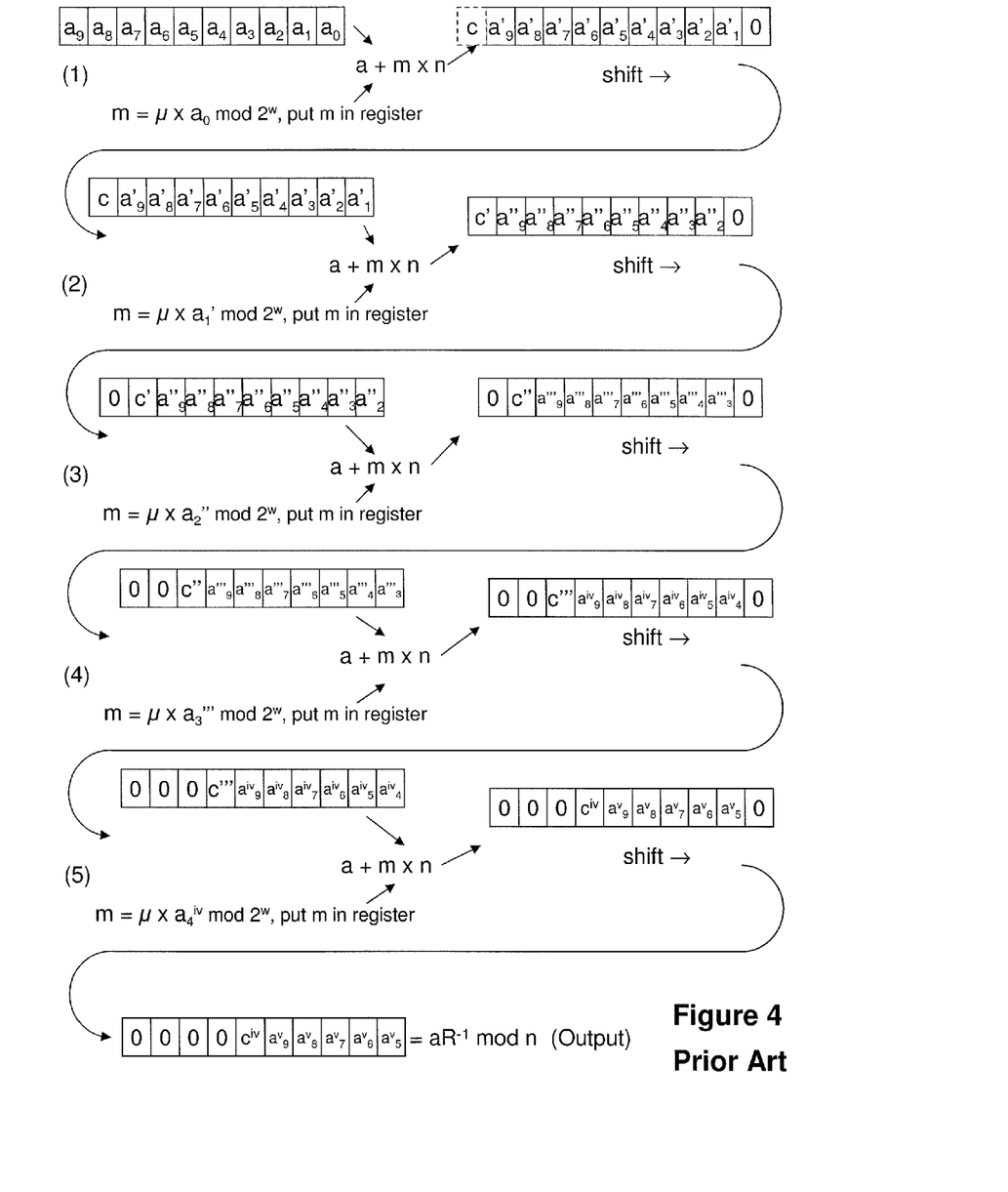
FIG. 4 is a flow diagram illustrating an example reduction of a 10-word value a and a 5-word modulus n using the logic shown in FIG. 3.

Turning now to FIG. 4, an example is shown involving the reduction of a 10 word value a and a 5-word modulus n (i.e. k=5 iterations in this example where typically a is twice the length of n) comprising the words $a_9,a_8,a_7,a_6,a_5,a_4,a_3,a_2,a_1$ and $a_0$ according to the configuration shown in FIG. 3, to illustrate the operations required in a typical Montgomery style reduction. In the first iteration, the multiplier m is computed using the least significant word $a_0$ and the value for $\mu$ stored locally in a register, and a value representative of m is stored for the next computation. Then a+m×n is computed using m and the initial representation of a. In the result, the least significant word $a_0$ is "zeroed" and a carry may be produced (shown in FIG. 4 after shifting). During this operation, or subsequently, the once operated upon values that remain, namely $a_9',\ldots,a_2'$, and $a_1'$, along with the carry c are fed into the next iteration, where the process is repeated. In the second iteration, the once operated upon value $a_1'$, which is now the least significant word in the first intermediate representation of a is zeroed by computing m and then a+m×n is computed as before and the result shifted down one word. This is repeated for the remaining iterations resulting in a four times operated on carry c'''' and five times operated on values of the remaining words, since an iteration for each word in n is applied. The four times operated on carry c'''' and the remaining values $a^v{}_9, a^v{}_8, a^v{}_7, a^v{}_6$, and $a^v{}_5$ may then be used as an output representing $aR^{-1}$ mod n.

As shown in FIGS. 3 and 4, a typical Montgomery-style reduction requires storing both $\mu$ and n in registers. Also, two multiplications are required in each iteration, one single precision to derive m, and a second multi-precision multiplication to apply m to n. In a machine 22 that has a limited number of registers and/or computational capabilities, it is desirable to reduce both the number of stored values and the number of computations. To avoid having to store both $\mu$ and n, it has been recognized by the inventor that a modified reduction value or a logical shift or signed version of such a value can be used in place of $\mu$ and n for the bulk of the low-order reduction.

Figure 5:
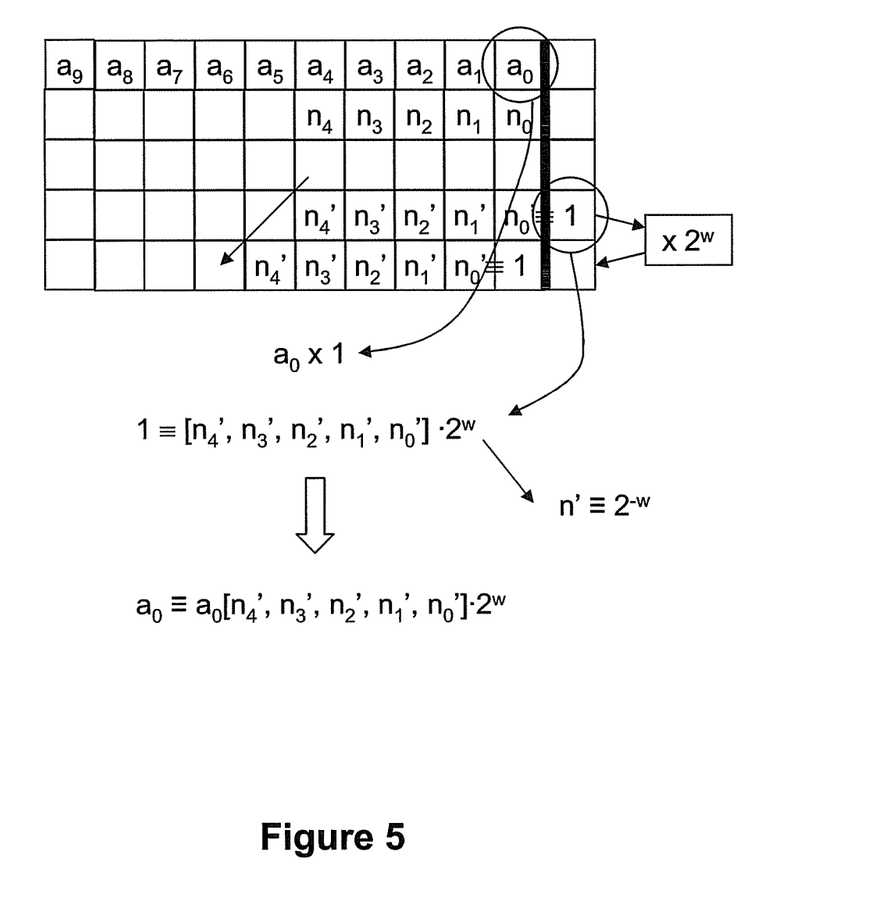
FIG. 5 is a schematic block diagram illustrating the creation of a modified reduction value.

Turning to FIG. 5, a visualization of the determination of one example of such a modified reduction value is shown. In this example, a 10-word value a (i.e. $a_9,\ldots a_0$) is again shown with the least significant word $a_0$ in alignment with the least significant word of a 5-word modulus (i.e. $n_4,\ldots n_0$). For example, consider a 160-bit prime n, such as the prime used in elliptic curve cryptography (ECC) operations in the Advanced Access Content System (AACS) standard. On a 32-bit machine, therefore, $n=[n_4,n_3,n_2,n_1,n_0]$.

A modified reduction value $n'=[n_4',n_3',n_2',n_1',n_0']$ that is used to zero the least significant non-zero word of a at each iteration, without the need to first multiply by $\mu$ and determine m is found by setting $n'=2^{-w}$ mod n which is also therefore in the range greater than 0 and less than n. It can be appreciated that the modified reduction value n' may be generated by the machine 22 or it may be received or otherwise obtained and stored by the machine 22. It can also be appreciated that the modified reduction value n' may be generated by another entity and made available to the machine 22 for performing a reduction in a cryptographic operation.

To see the usefulness of this new value, it is noted that if the value n' is then shifted up by one digit, which is equivalent to multiplying by $2^w$, a value is obtained that is equivalent to 1 mod n. Consequently, the value $a_0$ can be replaced with $a_0 \times n' \times 2^w$, that is, $a_0$ multiplied by n' shifted up one digit. To be explicit $a \equiv [\ldots,a_4,a_3,a_2,a_1,a_0]$ is replaced with $a \equiv [\ldots,a_4,a_3,a_2,a_1,0]+a_0 \times n' \times 2^w$. Since $a_0 \times n' \times 2^w$, taken without reduction, is zero in its least significant digit (by the shift $2^w$), the resulting value is 0 in its least significant digit, which is the desired low-order reduction. Typically this zero digit will be treated by shifting (either logically or physically) the value down by a digit. The modified reduction value $n'=2^{-w}$ mod n, is a convenient replacement for the values $\mu$ and n used in the Montgomery reduction method. This also avoids both the multiplication necessary to compute m and the storage required for $\mu$. Here, the multiplication by $2^w$ indicates that the product $a_0 \times n'$ is to be added in starting at the position of $a_1$, and thus involves no additional multiplication effort. It may also be noted that n' is defined modulo n and therefore does not require more registers than would be needed to define n itself.

Figure 6:
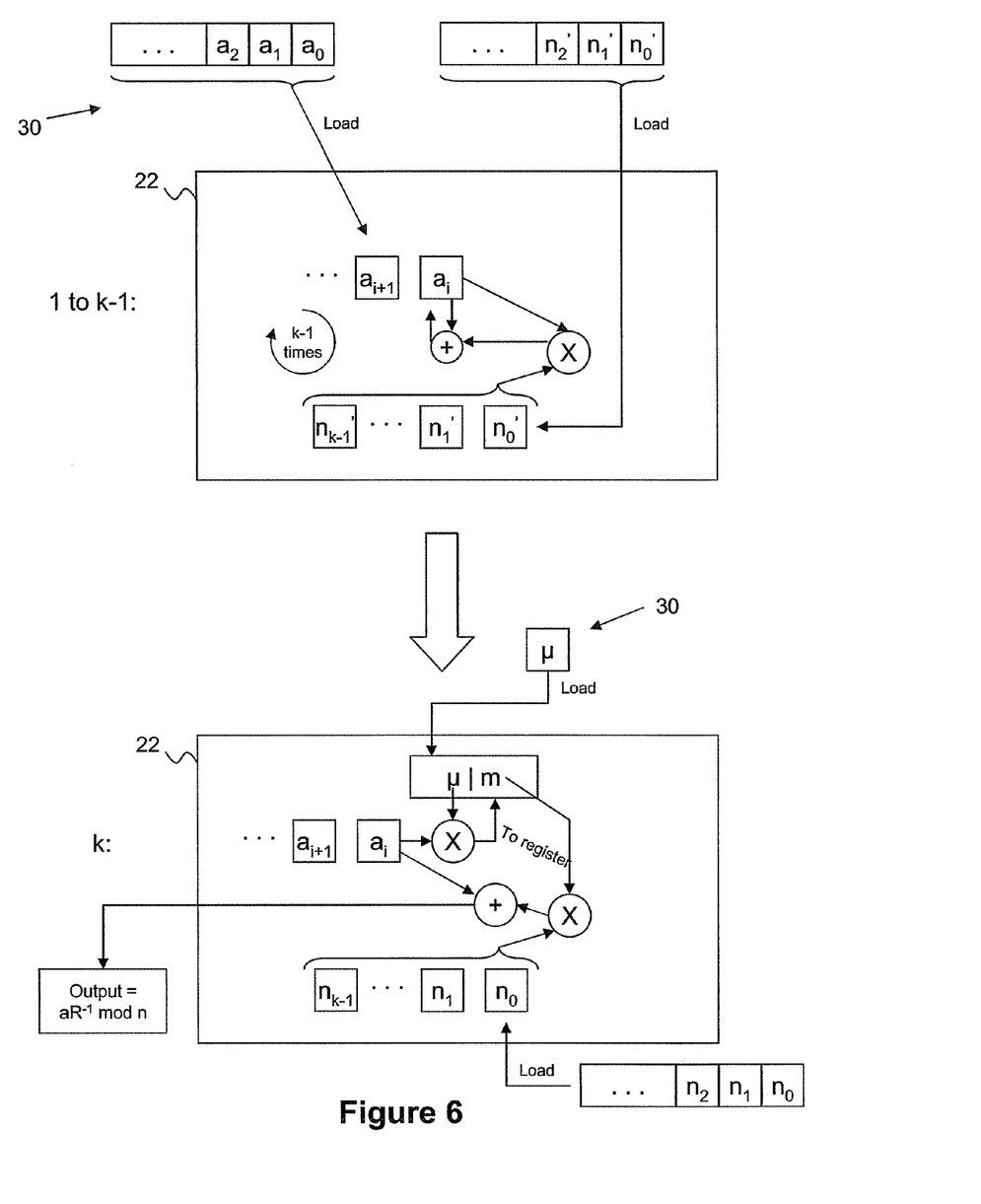
FIG. 6 is a schematic block diagram of logical operations performed during a modified Montgomery reduction using the modified reduction value.

If k w-bit words are to be reduced, then the implementation described above can be used to reduce the lowest k−1 words. Turning now to FIG. 6, it can be seen that by obtaining and using the modified reduction value n', for iterations 1 to k−1, the least significant word is removed from the value and is multiplied by the value n' and $2^w$, and added to the remaining words of a to zero the least significant word without requiring the storage of $\mu$ or the computation and storage of the multiplier m.

The difficulty with reducing the k-th word is that the value $a_0 \times n'$ is typically k+1 digits in length; using this technique for the k-th word would therefore result in a too-large result. A simple expedient is to perform the last digit reduction with the standard Montgomery algorithm, as will be shown in the example below.

For the last iteration, i.e. iteration k, as shown in FIG. 6, the value $\mu$ may be loaded from memory 30 and stored in a register for use in computing m in the last iteration. Since this is the last iteration, the storage used for $\mu$ in this operation can be conveniently reused for m, since typically $\mu$ is no longer needed in the reduction operation.

Figure 7:
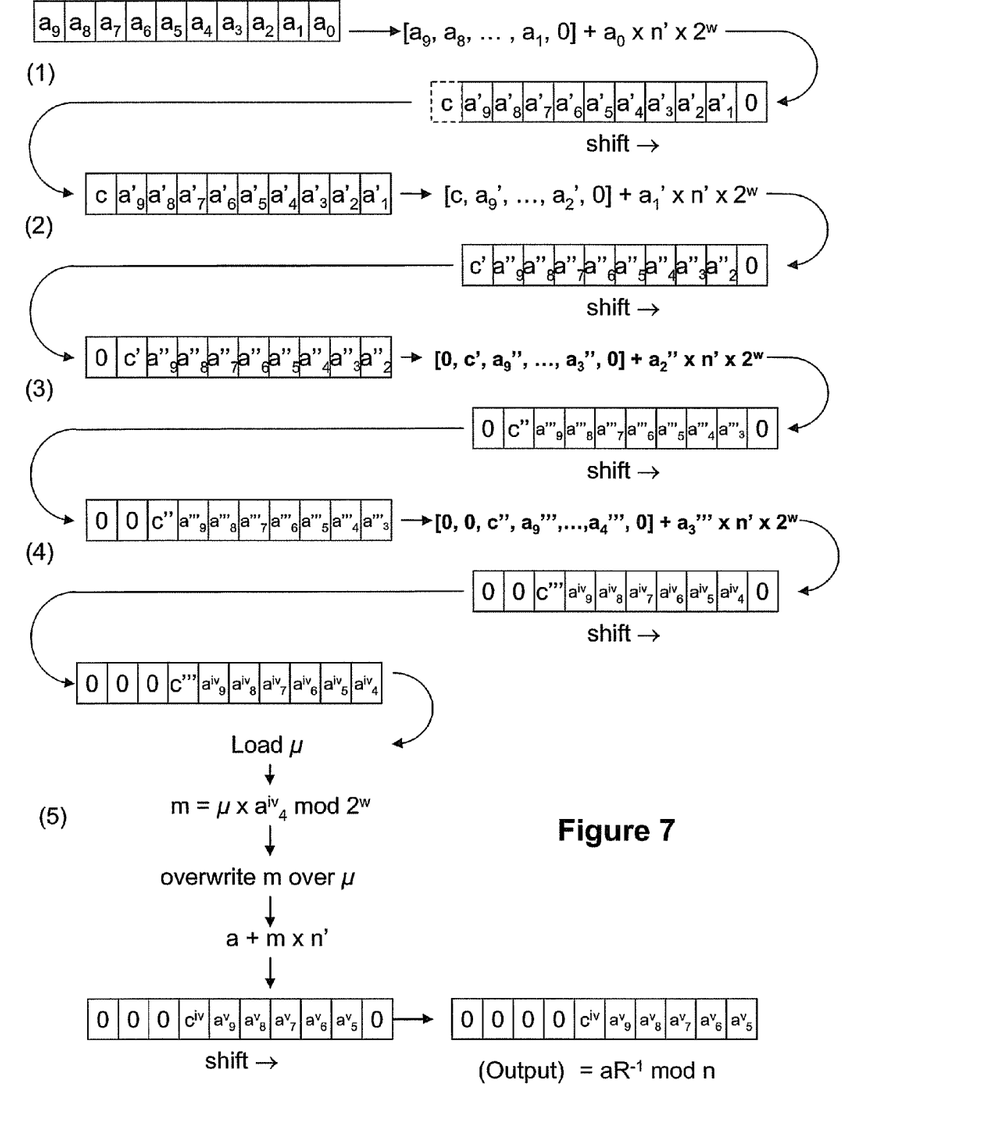
FIG. 7 is a flow diagram illustrating an example reduction of a 10-word value a and a 5-word modulus n using the logic shown in FIG. 6.

As shown in FIG. 7, by obtaining and using the modified reduction value n' and applying the relationship $a \equiv [\ldots,a_4,a_3,a_2,a_1,0]+a_0 \times n' \times 2^w$ at each iteration, the least significant word of a is zeroed and the remaining words modified. As before, either during or after this operation, the modified words are shifted down such that the next most significant word becomes the next least significant word for the next iteration. The carry is also operated on as it is accumulated over the iterations. This process is repeated k−1 until the original most significant words (i.e. those that have not been zeroed) in their current form, plus the carry in its current form are shifted down to the least significant spaces except for one more word (not counting the carry) to be reduced. At this point, the value for $\mu$ is called and stored in a register. The value for $\mu$ and the least significant word (which in this example is a four times operated on value $a_4''''$) are used to compute the multiplier m after which $\mu$ is overwritten with m. The final reduction operation can then be performed and the value shifted down to provide the result $aR^{-1}$ mod n.

It can be seen that, for the reduction of 2k digit values, where each digit has w-bits (such as results from Montgomery multiplication, interleaved or not), the configuration shown in FIGS. 6 and 7 saves k−1 multiplications and the storage required form (instead we can store the union $\{\mu, m\}$ in one location). The modification herein described is particularly applicable to the computation of ECC operations on small curves, such as the AACS 160 bit curve where 4 out of 30 multiplications are saved in the reduction (roughly 13%). In the case of ECC, typically the parameters are determined in advance, and therefore, it is convenient to pre-compute n' for storage with the ECC parameters. Saving the single register is also particularly convenient when implementing the modified reduction on a typical RISC machine with a small number of registers, such as the popular ARM architecture.

To illustrate the principles described herein, a numerical example will now be given comparing a traditional Montgomery-style reduction to one using the modified reduction value described in the above examples.

In this numerical example, the prime being used corresponds to that used in AACS copy protection. The AACS elliptic curve prime is:

p: 900812823637587646514106462588455890498729007071 or in hex, which we prefix with 0x:

p: 0x9DC9D81355ECCEB5608DB09EF9EAE7C479A7D7DF.

In 32-bit digits, we write: p: ['0x9DC9D813', '0x55ECCEB5', '0x60BDB09E', '0xF9EAE7C4', '0x79A7D7DF'].

It may be noted that in the following, this ordering of most significant word to least significant word will be used. We have a value to reduce, which came from multiplication, of:

c: 0x1395FD9CD9B7F6507FED4AE8A588D63FC0519ACC58DC9338535F8505B1146BD6D5F3 3E0CDBAF7E72.

In 32-bit digits, we write:

c: ['0x1395FD9C', '0xD9B7F650', '0x7FED4AE8', '0xA588D63F', '0xC0519ACC', '0x58DC9338', '0x535F8505', '0xB1146BD6', '0xD5F33E0C', '0xDBAF7E72'].

The low digit is: 0xDBAF7E72. Then, using standard Montgomery reduction, we reduce the lowest word using the multiple of p as follows: m: 0x77E2A832; adding m*p, which then produces:

c_1: 0x1395FD9CD9B7F6507FED4AE8A588D6400A3622195E1866874F5E807EE48E1202BDEDD DC800000000.

In 32-bit digits, we write:

c_1: ['0x1395FD9C', '0xD9B7F650', '0x7FED4AE8', '0xA588D640', '0x0A362219', '0x5E186687', '0x4F5E807E', '0xE48E1202', '0xBDEDDDC8', '0x00000000'], shifting down a word, and reducing, the low digit is now: 0xBDEDDDC8, with m*p where:

m: 0xE2AE04C8.

This then produces:

c_2: 0x1395FD9CD9B7F6507FED4AE9314049246646B3FCD103F0983F0236DECAA31210000000 00.

In 32-bit digits, we write:

c_2: ['0x1395FD9C', '0xD9B7F650', '0x7FED4AE9', '0x31404924', '0x6646B3FC', '0xD103F098', '0x3F0236DE', '0xCAA31210', '0x00000000'], wherein shifting down a word, and reducing, results in a low digit of: 0xCAA31210, with m*p where, m: 0x4CE9010.

This then produces:

c_3: 0x1395FD9CD9B7F65082E3C380C44F827824D075242C0D2DC1920FBC0400000000.

In 32-bit digits, we write:

c_3: ['0x1395FD9C', '0xD9B7F650', '0x82E3C380', '0xC44F8278', '0x24D07524', '0x2C0D2DC1', '0x920FBC04', '0x00000000'], wherein the low digit is: 0x920FBC04, and m is: 0xDC2DAB84.

This then produces: c_4: 0x1395FD9D616D92334B89B422758244BD6651858488128C5800000000.

In 32-bit digits, we write:

c_4: ['0x1395FD9D', '0x616D9233', '0x4B89B422', '0x758244BD', '0x66518584', '0x88128C58', '0x00000000'], wherein shifting down a word, and reducing results in a low digit of: 0x88128C58, with m*p, where m: 0xB788A158.

This then produces:

c_5: 0x84B57DC02C65EF743B73D25A7BE6A7089E2B5E0C00000000.

In 32-bit digits, we write:

c_5: ['0x84B57DC0', '0x2C65EF74', '0x3B73D25A', '0x7BE6A708', '0x9E2B5E0C', '0x00000000'], wherein shifting down a word produces the Montgomery reduced value:

c_5: ['0x84B57DC0', '0x2C65EF74', '0x3B73D25A', '0x7BE6A708', '0x9E2B5E0C'].

To illustrate use of the modified reduction value, we will now reduce the value c (which came from multiplication), with the new technique:

Writing $2^{\wedge}(-w)$ mod p, we produce p prime (pp).

pp: 0x19F7AD1974CCB5FA19DCBE3B4DFF7FDE4421C2FB.

In 32-bit digits, we write:

pp: ['0x19F7AD19', '0x74CCB5FA', '0x19DCBE3B', '0x4DFF7FDE', '0x4421C2FB']

c: 0x1395FD9CD9B7F6507FED4AE8A588D63FC0519ACC58DC9338535F8505B1146BD6D5F3 3E0CDBAF7E72.

In 32-bit digits, we write:

c: ['0x1395FD9C', '0xD9B7F650', '0x7FED4AE8', '0xA588D63F', '0xC0519ACC', '0x58DC9338', '0x535F8505', '0xB1146BD6', '0xD5F33E0C', '0xDBAF7E72'].

Removing the low digit, wherein the low digit: 0xDBAF7E72, and adding the low digit *pp produces:

c_1: 0x1395FD9CD9B7F6507FED4AE8BBD1847753212F3C77AE39F543914FDDBB04373ACD88 9BD200000000.

In 32-bit digits, we write: c_1: ['0x1395FD9C', '0xD9B7F650', '0x7FED4AE8', '0xBBD18477', '0x53212F3C', '0x77AE39F5', '0x43914FDD', '0xBB04373A', '0xCD889BD2', '0x00000000'], which we can shift down one digit.

Then, removing the low digit: 0xCD889BD2, and adding the low digit *pp produces:

c_2: 0x1395FD9CD9B7F65094C67BE856D9E78B08D065A8E2E737F5DC370284A41C222000000 000.

In 32-bit digits, we write: c_2: ['0x1395FD9C', '0xD9B7F650', 0x94C67BE8, '0x56D9E78B', '0x08D065A8', '0xE2E737F5', '0xDC370284', '0xA41C2220', '0x00000000'], which we can shift down one digit.

Now, removing the low digit: 0xA41C2220, and adding the low digit *pp produces:

c_3: 0x1395FD9CEA5D7BC1F6556B9240881C406220434AF1C7CD64FBC8B7E400000000.

In 32-bit digits, we write: c_3: ['0x1395FD9C', '0xEA5D7BC1', '0xF6556B92', '0x40881C40', '0x6220434A', '0xF1C7CD64', '0xFBC8B7E4', '0x00000000'], which we can shift down one digit.

Now, removing the low digit:0xFBC8B7E4, and adding the low digit *pp produces:

c_4: 0x2D20307B4918CF46B57CE9C6D8EC5FCE50885C802F52E1F000000000.

In 32-bit digits, we write: c_4: ['0x2D20307B', '0x4918CF46', '0xB57CE9C6', '0xD8EC5FCE', '0x50885C80', '0x2F52E1F0', '0x00000000'], which we can shift down one digit.

Now using standard Montgomery reduction for the last digit:

The low digit is: 0x2F52E1F0. Using multiple m:0x 8E18E3F0, and adding m*p produces:

c_5: 0x84B57DC02C65EF743B73D25A7BE6A7089E 2B5E0C00000000.

In 32-bit digits, we write: c_5: ['0x84B57DC0', '0x2C65EF74', '0x3B73D25A', '0x7BE6A708', '0x9E2B5E0C', '0x00000000'].

Next, shifting down one digit produces: ['0x84B57DC0', '0x2C65EF74', '0x3B73D25A', '0x7BE6A708', '0x9E2B5E0C'], which is congruent mod p with the Montgomery reduced value.

Although the invention has been described with reference to certain specific embodiments, various modifications thereof will be apparent to those skilled in the art without departing from the spirit and scope of the invention as outlined in the claims appended hereto.

The invention claimed is:

1. A method for performing, on a cryptographic apparatus, a Montgomery-style reduction in a cryptographic operation, the method comprising:
   obtaining an operand for the cryptographic operation;
   computing a modified operand using a reduction value, instead of a modulus used in performing a standard Montgomery reduction, to perform a replacement of a least significant word of the operand, rather than perform a cancellation thereof, the reduction value being a function of the modulus; and
   outputting the modified operand.

2. The method according to claim 1 wherein the reduction value is $n'=2^{-w}$ mod n, or a shifted or signed version of n', w corresponds to a word size, and n corresponds to the modulus.

3. The method according to claim 1, wherein the computing further comprises:
   successively applying the reduction value to perform a replacement of each of the second least significant word of the operand through the second most significant word of the operand; and
   performing a standard Montgomery reduction on the most significant word of the operand.

4. The method according to claim 3, wherein the performing a standard Montgomery reduction comprises storing a precomputed value μ in a register, using the value μ in computing another value m, and overwriting the register with m.

5. The method according to claim 1, wherein the cryptographic apparatus comprises a Montgomery engine configured to perform the cryptographic operation.

6. The method according to claim 1, wherein the reduction value is pre-computed and stored with one or more cryptographic system parameters prior to the computing.

7. The method according to claim 1, wherein the performing comprises zeroing the least significant word of the operand, modifying one or more remaining words, and shifting one or more modified words, wherein the shifting is either logical or physical.

8. The method according to claim 7, wherein if a carry is produced during the computing, the outputting comprises adding the carry as a most significant word in the modified operand.

9. The method according to claim 1, wherein said cryptographic operation comprises multiplication or squaring.

10. A cryptographic apparatus comprising a processor configured to operate as a Montgomery engine, and computer executable instructions that when executed by the processor:
    obtain an operand for the cryptographic operation;
    compute a modified operand using a reduction value, instead of a modulus used in performing a standard Montgomery reduction, to perform a replacement of a least significant word of the operand, rather than perform a cancellation thereof, the reduction value being a function of the modulus; and
    output the modified operand.

11. The apparatus according to claim 10, wherein said reduction value is $n'=2^{-w}$ mod n, or a shifted or signed version of n', w corresponds to a word size, and n corresponds to the modulus.

12. The apparatus according to claim 10, wherein the computing further comprises:
    successively applying the reduction value to perform a replacement of each of the second least significant word of the operand through the second most significant word of the operand; and
    performing a standard Montgomery reduction on the most significant word of the operand.

13. The apparatus according to claim 12, wherein performing a standard Montgomery reduction comprises storing a precomputed value μ in a register, using the value μ in computing another value m, and overwriting the register with m.

14. The apparatus according to claim 10, wherein the reduction value is pre-computed and stored with one or more cryptographic system parameters prior to the computing.

15. The apparatus according to claim 10, wherein the performing comprises zeroing the least significant word of the operand, modifying one or more remaining words, and shifting one or more modified words, wherein the shifting is either logical or physical.

16. The apparatus according to claim 15, wherein if a carry is produced during the computing, the apparatus is configured to add the carry as a most significant word in the modified operand.

17. The apparatus according to claim 10, wherein the cryptographic operation comprises multiplication or squaring.

18. A non-transitory computer readable medium comprising computer executable instructions that when executed by a cryptographic apparatus, cause the cryptographic apparatus to:
    obtain an operand for the cryptographic operation;
    compute a modified operand using a reduction value, instead of a modulus used in performing a standard Montgomery reduction, to perform a replacement of a least significant word of the operand, rather than perform a cancellation thereof, the reduction value being a function of the modulus; and
    output the modified operand.

19. The non-transitory computer readable medium according to claim 18, wherein said reduction value is $n'=2^{-w}$ mod n, or a shifted or signed version of n', w corresponds to a word size and n corresponds to the modulus.

20. The non-transitory computer readable medium according to claim 18, wherein the computing further comprises:
    successively applying the reduction value to perform a replacement of each of the second least significant word of the operand through the second most significant word of the operand; and
    performing a standard Montgomery reduction on the most significant word of the operand.

21. The non-transitory computer readable medium according to claim 20, wherein performing a standard Montgomery reduction comprises storing a precomputed value $\mu$ in a register, using the value $\mu$ in computing another value m, and overwriting the register with m.

22. The non-transitory computer readable medium according to claim 18, wherein the reduction value is pre-computed and stored with one or more cryptographic system parameters prior to the computing.

23. The non-transitory computer readable medium according to claim 18, wherein the performing comprises zeroing the least significant word of the operand, modifying one or more remaining words, and shifting one or more modified words, wherein the shifting is either logical or physical.

24. The non-transitory computer readable medium according to claim 23, wherein if a carry is produced during the computing, executing instructions to add the carry as a most significant word in the modified operand.

25. The non-transitory computer readable medium according to claim 18, wherein the cryptographic operation comprises multiplication or squaring.

* * * * *